US006827807B2

(12) United States Patent
Westbrook et al.

(10) Patent No.: US 6,827,807 B2
(45) Date of Patent: Dec. 7, 2004

(54) PROCESS FOR PRODUCING MULTILAYER STRUCTURES HAVING A LAYER FORMED FROM A BLEND OF AN ETHYLENE-ALPHA-OLEFIN INTERPOLYMER AND AN ETHYLENE-ALKYL ACRYLATE INTERPOLYMER

(75) Inventors: Bradley Scott Westbrook, Longview, TX (US); Guy Glen Luneau, Kilgore, TX (US)

(73) Assignee: Eastman Chemical Company, Kingsport, TN (US)

( * ) Notice: Subject to any disclaimer, the term of this patent is extended or adjusted under 35 U.S.C. 154(b) by 291 days.

(21) Appl. No.: 10/118,739

(22) Filed: Apr. 9, 2002

(65) Prior Publication Data

US 2003/0188823 A1 Oct. 9, 2003

(51) Int. Cl.[7] .................................................. C09J 7/00
(52) U.S. Cl. ........................ 156/242; 156/324; 156/332; 156/334
(58) Field of Search ................................ 156/242, 332, 156/334, 324, 580

(56) References Cited

U.S. PATENT DOCUMENTS

| | | | |
|---|---|---|---|
| 3,663,663 A | | 5/1972 | McAda |
| 4,218,500 A | * | 8/1980 | Radisch ........................ 428/78 |
| 4,312,918 A | | 1/1982 | Bostwick |
| 4,623,567 A | | 11/1986 | Hert |
| 4,623,581 A | | 11/1986 | Hert |
| 4,877,663 A | | 10/1989 | Kambe et al. |
| 4,987,191 A | | 1/1991 | Hayashida et al. |
| 5,051,297 A | | 9/1991 | Reich et al. |
| 5,066,724 A | | 11/1991 | Reich et al. |
| 5,112,696 A | | 5/1992 | Roberts |
| 5,582,923 A | | 12/1996 | Kale et al. |
| 5,773,155 A | | 6/1998 | Kale et al. |
| 5,863,665 A | | 1/1999 | Kale et al. |
| 6,005,053 A | | 12/1999 | Parikh et al. |
| 6,180,245 B1 | * | 1/2001 | Janssen et al. .............. 428/426 |
| 6,632,911 B1 | * | 10/2003 | Takahashi et al. ....... 526/348.1 |

* cited by examiner

*Primary Examiner*—Blaine Copenheaver
*Assistant Examiner*—Barbara J. Musser
(74) *Attorney, Agent, or Firm*—Steven A. Owen; Bernard J. Graves, Jr.

(57) ABSTRACT

There is disclosed a process for producing a multilayer structure, the film of which has particular utility as a masking film for the substrate layer. The process comprises the cast film process producing a monolayer film from a specified blend of ethylene-alpha-olefin and ethylene-alkyl acrylate interpolymers, or a multilayer film, at least one of the layers formed from the blend of interpolymers, and pressing the cast film process produced monolayer or multilayer film onto a polymeric or glass substrate layer that is maintained at a temperature of about 38 to about 80° C. during the pressing of the layers.

16 Claims, No Drawings

PROCESS FOR PRODUCING MULTILAYER STRUCTURES HAVING A LAYER FORMED FROM A BLEND OF AN ETHYLENE-ALPHA-OLEFIN INTERPOLYMER AND AN ETHYLENE-ALKYL ACRYLATE INTERPOLYMER

FIELD OF THE INVENTION

This invention relates to a process for producing a multilayer structure wherein a film layer of the multilayer structure is adhered to a substrate layer of the multilayer structure, the film of which is particularly suitable for use as a masking, protective, cling or adhesive film for the substrate layer. The film layer applied to the substrate layer may be a monolayer film or a multilayer film.

BACKGROUND OF THE INVENTION

The use of thin masking films to protect various substrates from scratches, blemishes, oxidation, and the like, is known. However, it is also known that adhering the masking films to the substrates may be difficult. Accordingly, it is desirable to provide a process that will produce a multilayer structure wherein a monolayer or a multilayer film of the multilayer structure is adhered well to a substrate layer of the structure, particularly for use as a masking layer to provide protection for the substrate layer from scratches, blemishes, oxidation, and the like.

SUMMARY OF THE INVENTION

The novel process of the present invention for producing the multilayer structures is comprised as follows. A blend comprising an ethylene-alkyl acrylate interpolymer, in an amount of greater than 25 to about 90% by weight, based on the blend, and an ethylene-alpha-olefin interpolymer, in an amount of less than 75 to about 10%, by weight of the blend, is formed into a film by the well-known cast process for producing films. The films from the blends may be produced by the cast process either in the form of a monolayer film, or in the form of a multilayer film with a second layer comprising any polymeric material, such as, for example, a low density polyethylene, a linear low density polyethylene, a high density polyethylene, a polyethylene terephthalate, polyvinyl chloride, polypropylene, ethylene-vinyl acetate, or the like. The resultant cast process produced monolayer film formed from the blend of ethylene-alpha-olefin interpolymer and ethylene-alkyl-acrylate interpolymer, or the cast process produced multilayer film comprising a layer of the film from the blend, is then adhered to a substrate layer by pressing the monolayer film or multilayer film onto the substrate layer. The substrate layer may be any polymeric material, such as polyesters, polycarbonates, acrylics, and the like, or may be glass. It is essential that the substrate layer be maintained at a temperature ranging from about 38 to about 80° C. during the pressing of the monolayer or multilayer film onto the substrate layer.

The ethylene-alkyl acrylate interpolymer of the blend comprises from about 70 to about 85% by weight ethylene, based on the interpolymer, and from about 15 to about 30% by weight alkyl acrylate, based on the interpolymer. The ethylene-alkyl acrylate interpolymer has a melt index ranging from about 0.3 to about 20 g/10 minutes. The alkyl acrylate has an alkyl group of from 1 to 10 carbons.

The ethylene-alpha-olefin interpolymer of the blend comprises ethylene and an alpha-olefin having 3 to 16 carbons. The ethylene-alpha-olefin interpolymer has a melt index ranging from about 0.3 to about 10 g/10 min., and a density ranging from about 0.88 to less than 0.920 g/cc.

For the purpose of the present invention, adhesion is regarded as acceptable where a value of 10 to 100 g/inch is measured using the peel test method described herein.

DETAILED DESCRIPTION OF THE INVENTION

The novel process of the present invention for producing the multilayer structures is comprised as follows. A blend comprising an ethylene-alkyl acrylate interpolymer, in an amount of greater than 25 to about 90% by weight, based on the blend, and an ethylene-alpha-olefin interpolymer, in an amount of less than 75 to about 10%, by weight of the blend, is formed into a film by the well-known cast process for producing films. The films from the blends may be produced by the cast process either in the form of a monolayer film, or in the form of a multilayer film with a second layer comprising any polymeric material, such as, for example, a low density polyethylene, a linear low density polyethylene, a high density polyethylene, a polyethylene terephthalate, polyvinyl chloride, polypropylene, ethylene-vinyl acetate, or the like. The resultant cast process produced monolayer film formed from the blend of ethylene-alpha-olefin interpolymer and ethylene-alkyl-acrylate interpolymer, or the cast process produced multilayer film comprising a layer of the film from the blend, is then adhered to a substrate layer by pressing the monolayer film or multilayer film onto the substrate layer. The substrate layer may be any polymeric material, such as polyesters, polycarbonates, acrylics, and the like, or may be glass. It is essential that the substrate layer be maintained at a temperature ranging from about 38 to about 80° C. during the pressing of the monolayer or multilayer film onto the substrate layer.

The ethylene-alkyl acrylate interpolymer of the blend comprises from about 70 to about 85% by weight ethylene, based on the interpolymer, and from about 15 to about 30% by weight alkyl acrylate, based on the interpolymer. The ethylene-alkyl acrylate interpolymer has a melt index ranging from about 0.3 to about 20 g/10 minutes. The alkyl acrylate has an alkyl group of from 1 to 10 carbons.

The ethylene-alpha-olefin interpolymer of the blend comprises ethylene and an alpha-olefin having 3 to 16 carbons. The ethylene-alpha-olefin interpolymer has a melt index ranging from about 0.3 to about 10 g/10 min., and a density ranging from about 0.88 to less than 0.920 g/cc.

For the purpose of the present invention, adhesion is regarded as acceptable where a value of 10 to 100 g/inch is measured using the peel test method described herein.

More particularly, the ethylene-alpha-olefin interpolymer used in preparing the blends herein, that are cast process produced into monolayer or multilayer films, may be any ethylene-alpha-olefin interpolymer comprising ethylene and at least one, or more, other alpha-olefin. The alpha-olefin monomer(s) contains from 3 to 16 carbon atoms. Exemplary alpha-olefins useful herein are propylene, 1-butene, 1-pentene, 1-hexene, 1-heptene, 1-octene, 4-methyl-1-pentene, 1-decene, 1-dodecene, 1-hexadecene and the like. Also utilizable herein as the alpha-olefin monomer are non-conjugated dienes and olefins formed in situ in the polymerization medium. The ethylene-alpha-olefin interpolymers may be linear or may contain rheologically significant long chain branches, such as the "substantially linear" polymers, and may be produced by any process, such as solution, gas phase, or slurry loop, and with any olefin polymerization catalyst, such as the constrained geometry, metallocene type, Ziegler Natta types, or chromium oxide types. The ethylene-alpha-olefin interpolymer is present in the blends that are cast process produced into films herein, in amounts ranging from less than 75 to about 10% by weight of the blend.

The ethylene-alpha-olefin interpolymers are further characterized as having a melt index ranging from about 0.3 to about 10 g/10 min., preferably from about 0.5 to about 3 g/10 min., and a density ranging from about 0.88 to less than 0.920 g/cc. In a preferred embodiment, the ethylene-alpha-olefin utilized is an ethylene/1-hexene interpolymer having a melt index of 0.85 g/10 min., and a density of 0.910 g/cc.

The ethylene-alkyl acrylate interpolymer used in preparing the blends herein, that are cast process produced into monolayer or multilayer films, may be any ethylene-alkyl acrylate interpolymer having an alkyl group of from 1 to 10 carbons. Examples of the alkyl acrylates include methyl acrylate, ethyl acrylate and butyl acrylate. Preferred for use herein is an ethylene-methyl acrylate interpolymer.

The ethylene-alkyl acrylate interpolymers are further characterized as having an ethylene content of about 70 to about 85 weight %, based on the interpolymer, and an alkyl acrylate content of about 15 to about 30 weight %, based on the interpolymer. The ethylene-alkyl acrylate interpolymer utilized herein has a melt index ranging from about 0.3 to about 20 g/10 min., preferably from about 0.4 to about 10 g/10 min., and most preferably from about 1 to about 3 g/10 minutes.

The ethylene-alpha-olefin interpolymers and the ethylene-alkyl acrylate interpolymers utilized herein may be prepared by any process known in the art. For example, the ethylene-alpha-olefin interpolymers and the ethylene-alkyl acrylate interpolymers may be prepared by the well-known free radical polymerization process.

The blends of ethylene-alpha-olefin interpolymer and ethylene-alkyl acrylate interpolymer, from which films are produced by the cast process, are prepared by any method known in the art. For example, the components of the blends may be admixed together on a conventional mixing apparatus such as a mill roll, an extruder or a continuous mixer. In preparing the blends of the examples herein, pellets of each of the components were dry or tumble blended in a polyethylene-lined fiber drum type GC-9361S, available from GCC Drum, on a Plastic Tumbler Model T-2B, available from Injection Molding Supply Company, Inc., for a period of 10 minutes. The dry blends were tumbled at a rate of 17.5 revolutions per minute at a temperature of 72° F. and at a 50% relative humidity.

For many purposes, it may be desirable to incorporate other conventional additives with the compositions utilized in the present invention. For example, there may be added antioxidants, heat and light stabilizers, dyes, antistatic agents, lubricants, preservatives, processing aids, slip agents, antiblocking agents, pigments, flame retardants, blowing agents, and the like.

The monolayer, and multilayer films, comprising the films formed from the blends of ethylene-alpha-olefin interpolymer and ethylene-alkyl acrylate interpolymer defined herein, are produced by the well-known cast process for producing films. In general, the cast process is used to produce flat films. The extrusion section consists of a rotating screw extruder or extruders that take the raw material and compress, heat, melt, and convey it forward in the process. Attached to the discharge end of the extruder(s) is an adapter unit that provides for a transition between the extruder(s) and the film-forming die. The die is flat, with a wide, thin opening through which the molten polymer flows. The molten polymer curtain which flows from the die falls onto a metal casting roll where the curtain is rapidly cooled. The resulting film may pass across one or more additional metal chill rolls to complete the cooling process. The flat film is then sent on through the remainder of the process, ultimately being wound into a roll of product on a tubular core.

In more detail, the multilayer films, comprising as a layer, the films formed from the blends of ethylene-alpha-olefin interpolymer and ethylene-alkyl acrylate interpolymer defined herein, were prepared, in all of the examples, by the cast film process as follows:

Two layer films were produced by coextrusion, and were designated as A/B films. The A layer was 20% of the thickness of the film, and the B layer was 80% of the thickness of the film, with the overall thickness of the film approximately 2.5 mils. The A layer was comprised of the blend of the ethylene-alpha-olefin interpolymer and the ethylene-alkyl acrylate interpolymer specified in each of the examples. The B layer of the multilayer film was comprised of a blend comprising 98% by weight D7471-X homopolymer low density polyethylene having a melt index of 2.0 g/10 min. and a density of 0.920 g/cc, available from Eastman Chemical Company, and 2% by weight of a pelletized diatomaceous earth antiblock concentrate. The blends to be used as the B layer were prepared as shown herein.

Pellets of the tumbled blend to be formed into layer A, were fed to extruder A's hopper. A tumbled pellet blend comprising the D7471-X LDPE and the antiblock, to be formed into layer B, was fed into extruder B's hopper. In the following Table 1, there is shown the conditions for preparation of cast film of all the multilayer films of the examples utilizing extrusion practices. The coextrusion cast film line was the "Topcast" model manufactured by Egan-Davis Standard Corporation. The multilayer films of Examples 1 and 4 were prepared using the same conditions; and the multilayer films of Examples 2, 3, 5 and 6 were produced utilizing the same conditions; the two sets of conditions are different.

In all examples, the screw type used for both the 2.5 inch Extruder A and for the 3.5 inch Extruder B was a DSBII barrier, 30/1 L/D (Length/Diameter).

TABLE 1

Cast Film Fabrication Procedure

| Example No. | | 1 and 4 | 2, 3, 5 and 6 |
|---|---|---|---|
| Film Gauge, mils | | 2.50 | 2.50 |
| Line Speed, ft/minute | | 215 | 240 |
| Extruder A lb/hour | | 103 | 103 |
| Extruder B lb/hour | | 412 | 412 |
| Extruder A RPM | | 55 | 55 |
| Extruder B RPM | | 91 | 91 |
| Lb/Hr/Inch of Die | | 12.9 | 12.9 |
| 2.5" Extruder A Temperature Profile (deg. F.) | Zone 1 | 350 | 350 |
| | Zone 2 | 450 | 400 |
| | Zone 3 | 500 | 450 |
| | Zone 4 | 500 | 450 |
| | Zone 5 | 500 | 450 |
| | Screenpack | 425 | 450 |
| | Delivery Pipe | 425 | 450 |
| 3.5" Extruder B Temperature Profile (deg. F.) | Zone 1 | 350 | 350 |
| | Zone 2 | 400 | 400 |
| | Zone 3 | 450 | 450 |

TABLE 1-continued

Cast Film Fabrication Procedure

| Example No. | | 1 and 4 | 2, 3, 5 and 6 |
|---|---|---|---|
| | Zone 4 | 450 | 450 |
| | Zone 5 | 450 | 450 |
| | Screenpack | 450 | 450 |
| | Delivery Pipe | 450 | 450 |
| Block Temperatures, deg. F. | | 500 | 450 |
| Die Temperatures, deg. F. | | 500 | 450 |
| Screenpack Stack Arrangement, mesh | | 20-100-20 | 20-100-20 |
| Cast Roll Temp., deg. F. | | 70 | 70 |
| Chill Roll Temp., deg. F. | | 70 | 70 |
| Distance of die-to-cast roll, inches | | 0.5 | 0.5 |
| Melt Curtain Length, inches | | ~2 | ~2 |
| Electrostatic Edge-Pinning | | Yes | Yes |
| Vacuum Box vacuum, inches of water | | 1.5 | 1.5 |
| Roll Width, inches | | 25 | 25 |
| Roll Length, feet | | 600 | 600 |
| No. of Rolls | | 1 | 1 |
| Winder Tension, lbs | | 7 | 7 |
| Die Gap, mils | | 20 | 20 |

In preparing the multilayer structures by the present process, the monolayer films comprising the blends of ethylene-alpha-olefin interpolymer and ethylene-alkyl acrylate interpolymer produced by the cast film process, and the multilayer films comprising a layer formed from the blends comprising the ethylene-alpha-olefin and the ethylene-alkyl acrylate interpolymers, and produced by the cast film process, are pressed onto a substrate layer.

The substrate layer utilized herein may be any polymeric material such as, for example, a polyester, a copolyester, a polycarbonate, an acrylic, or the like, and the substrate may also be glass. It is essential that the monolayer or multilayer film produced by the cast process be pressed onto the substrate layer under conditions such that the substrate layer is maintained at a temperature ranging from about 38° to about 80° C. during the pressing of the monolayer or multilayer film, as described herein, onto the substrate layer.

As a result of the present process, satisfactory adherence of the monolayer film, and the multilayer film, comprising the blend of ethylene-alpha-olefin interpolymer and ethylene-alkyl acrylate interpolymer, to the substrate layer is achieved. Satisfactory adhesion, as used herein, is defined as a level, whether of cling or recling, of 10to 100 g/inch, as determined in accordance with the Peel Test Method defined herein.

In all of the examples herein, the multilayer films comprising a coextruded layer comprising a blend of an ethylene-alpha-olefin interpolymer and an ethylene-alkyl acrylate interpolymer, and a second layer comprising a low density polyethylene (LDPE) and an antiblock, produced by the cast film process, were adhered to a substrate layer comprising SPECTAR Copolyester 14471 having a density of 1.27 g/cc, according to ASTM D1505, produced and sold by Eastman Chemical Company, Kingsport, Tenn. The procedure utilized for adhering the multilayer films to the substrate layer, in each of the examples, is described in detail as follows.

The SPECTAR Copolyester 14471 was dried in a desiccated air dryer at 150° F. (65.6° C.) for 4 to 6 hours. The copolyester was vacuum transferred to the hopper of a 3.5 inch (90 millimeter) Breyer sheet extrusion line, Equipment No.190-63846-1. The Breyer extrusion system is controlled by electrical heaters that were set at the set points as shown in the following Table 2.

| Extruder Zone | Temperature Degrees F. (C) | Extruder Zone | Temperature Degrees F. (C) |
|---|---|---|---|
| Extruder zone 1 | 500 (260) | Die bottom zone 23 | 450 (232) |
| Extruder zone 2 | 500 (260) | Die bottom zone 25 | 450 (232) |
| Extruder zone 3 | 450 (232) | Die bottom zone 27 | 450 (232) |
| Extruder zone 4 | 450 (232) | Die bottom zone 29 | 450 (232) |
| Extruder zone 5 | 450 (232) | Die bottom zone 31 | 450 (232) |
| Extruder zone 6 | 450 (232) | Die top zone 24 | 450 (232) |
| Extruder zone 7 | 450 (232) | Die top zone 26 | 450 (232) |
| Screen changer | 450 (232) | Die top zone 28 | 450 (232) |
| Adapter | 450 (232) | Die top zone 30 | 450 (232) |
| Gear pump | 450 (232) | Die top zone 32 | 450 (232) |
| Adapter | 450 (232) | | |
| Coex block | 450 (232) | | |
| Adapter | 450 (232) | | |

The extrusion screw used was a 33:1 L/D barrier type, two-stage screw produced by Breyer. The extruder was vented in zone 5 using a vacuum to remove any gases that may form in the melted plastic during the extrusion process. The screw was internally cooled with 65° F. (18.3° C.) water in the feed section only. The blend of pellets was extruded into sheet using conventional extrusion practices to produce a sheet product that was 0.125 inches (3.175 millimeters) thick. The extruder, running at 90 revolutions per minute (rpm's), processed the melt blend through a screen pack and then through a 52 inch (1320 millimeter) wide Cloeren heavy gauge sheet die. The die opening used was 150 mil. The output of the extruder was 700 lb/hr, and a line speed of 36 in/min. Three chrome rolls cooled the sheet, operating at temperatures 75° F., 160° F., and 165° F.

The multilayer film produced by the cast process was then unrolled at a speed equal to the linespeed of the copolyester sheet, and the multilayer film was pressed onto the copolyester substrate layer with a nip roll, operating at a pressure of 40 psi. The acrylate-containing layer of the multilayer film faced the substrate layer. The copolyester substrate layer was maintained at the required temperature range of from about 38° to about 80° C. during the pressing of the multilayer film onto the substrate layer, by means of two banks of 8 infrared heaters manufactured by Breyer.

Test Procedures

The following test procedures were used herein in evaluating properties of the polymeric materials, and properties of the films, referred to herein, unless expressly stated otherwise.

| | |
|---|---|
| Melt Index | ASTM Test Method D1238 |
| Density | ASTM Test Method D4883 |
| Peel Test Method | This is a procedure for determining the level of adhesion, or peel force, of a film applied to a substrate, at a 90-degree angle. The procedure is applicable to instances where the monolayer or multilayer film was produced either by the cast film process or the blown film process. The procedure is described below, in complete detail, in steps 1–17. |

1. Cut a piece of the multilayer structure to the approximate dimensions of 12 inches long in the machine direction by 3 inches wide in the transverse direction. It may be necessary to use a bandsaw, a radial arm saw, or a metal shear machine to cut the thick multilayer structure to the stated dimensions.

2. Carefully cut with a sharp knife or a razor blade only the film portion of the multilayer structure to 12 inches long in the machine direction, and 1 inch wide in the transverse direction. Do not lift the film from the substrate during this cutting operation. Use the substrate as the cutting base for the sharp knife or razor blade.
3. Repeat steps 1 and 2 twice so that you will have three pieces of multilayer structures from which to conduct the peel tests.
4. Allow these pieces of multilayer structure to condition at 73° F. and 50% relative humidity for a minimum of 40 hrs.
5. Place a piece of the multilayer structure onto a flat metal jig. Use metal clips to secure the structure to the flat metal jig.
6. Secure the jig onto the base support of an Instron tensile testing machine or other similar apparatus.
7. With your fingers, lift one end of the one-inch wide slice of film off of the substrate. Clamp that free end of the film securely into the upper jaw of the Instron testing machine.
8. Start the Instron testing machine. This allows the upper jaw to begin moving upwards at 12 inches per minute.
9. Watch the film peeling away from the substrate. When the peel angle of film is 90 degrees from the substrate, press the keyboard's space bar to determine the 90-degree peel force in grams per inch.
10. Repeat steps 5 through 9 twice with fresh pieces of multilayer structure. Take an average of the three 90-degree peel values, and record the data.
11. If it is desired to obtain a re-cling value with the same piece of film, take a piece of film after step 9. Reapply that "used" film to the substrate by gently laying it lengthwise onto its original place in the middle of the substrate. Take care to lay the film smoothly onto the substrate, eliminating as many air bubbles as possible. At this point, no pressing force is applied to the film. It is simply laid onto the substrate.
12. Using a standard paintbrush, gently wipe the film lengthwise with the paintbrush to give the film better contact with the substrate. Wipe the film lengthwise three times with the paintbrush.
13. With your fingers, lift one end of the one-inch wide slice of reapplied film off of the substrate. Clamp that free end of the film securely into the upper jaw of the Instron testing machine.
14. Start the Instron testing machine. This allows the upper jaw to begin moving upwards at 12 inches per minute.
15. Watch the film peeling away from the substrate. When the peel angle of film is 90 degrees from the substrate, press the keyboard's space bar to determine the 90-degree re-cling value in grams per inch.
16. Take an average of three 90-degree re-cling values, and record the data.
17. Acceptable peel values, and re-cling values, are defined to be in the range of 10 to 100 grams per inch.

The invention will be more readily understood by reference to the following examples. There are, of course, many other forms of this invention which will become obvious to one skilled in the art, once the invention has been fully disclosed, and it will accordingly be recognized that these examples are given for the purpose of illustration only, and are not to be construed as limiting the scope of this invention in any way. Moreover, all U.S. patents referred to herein are incorporated by reference in their entirety.

EXAMPLES

In each of the Examples herein, there were utilized in preparing the films the following materials. An ethylene-hexene interpolymer, commercially available from Eastman Chemical Company as CV27507-F linear low density polyethylene having a melt index of 0.85 g/10 min. and a density of 0.910 g/cc, was utilized. As an ethylene-methyl acrylate interpolymer, there was utilized either SP2260 interpolymer having a melt index of 2.1 g/10 min., and a methyl acrylate content of 24% by weight, or SP1330 interpolymer having a melt index of 2.0 g/10 min., and a methyl acrylate content of 22% by weight. Both of the SP2260 and SP1330 ethylene-methyl acrylate interpolymers are commercially available from Eastman Chemical Company.

In each of the Examples, there was utilized as the substrate layer to which the film layer was adhered, SPECTAR Copolyester 14471, commercially available from Eastman Chemical Company, having a density of 1.27 g/cc, according to ASTM Test Method D1505.

In each of the Examples, there was coextruded with the film layer formed from the blend of ethylene-hexene interpolymer and ethylene-methyl acrylate interpolymer, a film layer formed from a blend comprising 98% by weight D7471-X homopolymer low density polyethylene (LDPE), available from Eastman Chemical Company; and 2% by weight pelletized diatomaceous earth antiblock concentrate. The concentrate was comprised of 20% by weight diatomaceous earth and 80% by weight of linear low density polyethylene having a melt index of 2 g/1 0 minutes.

Example 1 (Comparative)

A blend comprising 75% by weight CV27507-F ethylene-hexene interpolymer and 25% by weight SP2260 ethylene-methyl acrylate interpolymer was produced by dry, or tumble, blending as described herein. The blend was formed into a multilayer film utilizing the cast film process described herein.

The resultant cast process produced multilayer film was then pressed onto the copolyester substrate on the Breyer sheeting line, as described herein. At the time of pressing, the copolyester substrate was maintained at a temperature of 63° C. (146° F.).

The resultant multilayer structure, comprising the multilayer film adhered to the substrate layer, was evaluated to determine the level of peel force required to separate the multilayer film from the substrate sheet, using the Peel Test Method described herein. It was noted that the initial cling value was 0 grams per inch, and the re-cling value was 0 grams per inch. Both of the cling values were not acceptable levels of adhesion.

Example 2

The process of Example 1 was followed with the exception that the blend comprised 50% by weight CV27507-F ethylene-hexene interpolymer and 50% by weight SP2260 ethylene-methyl acrylate interpolymer. In this instance, testing for the level of peel force required to separate the multilayer film from the substrate layer revealed an initial cling value of 13.5 grams per inch, and a re-cling value of 14.6 grams per inch. Both of the cling values are acceptable levels of adhesion, and this multilayer film was particularly useful as a masking film.

Example 3

The process of Example 1 was followed with the exception that the blend comprised 25% by weight CV27507-F ethylene-hexene interpolymer and 75% by weight SP2260 ethylene-methyl acrylate interpolymer. Testing for the level of peel force required to separate the multilayer film from the substrate layer revealed an initial cling value of 91.1 grams per inch, and a re-cling value of 11.7 grams per inch. Both of the cling values are acceptable levels of adhesion, and this multilayer film was particularly useful as a masking film.

Example 4 (Comparative)

A blend comprising 75% by weight CV27507-F ethylene-hexene interpolymer and 25% by weight SP1330 ethylene-methyl acrylate interpolymer was produced by dry, or tumble, blending as described herein. The blend was formed into a multilayer film utilizing the cast film process described herein.

The resultant cast process produced multilayer film was then pressed onto the copolyester substrate on the Breyer sheeting line, as described herein. At the time of pressing, the copolyester substrate was maintained at a temperature of 63° C. (146° F.).

The resultant multilayer structure, comprising the multilayer film adhered to the substrate layer, was evaluated to determine the level of peel force required to separate the multilayer film from the substrate sheet, using the Peel Test Method described herein. It was noted that the initial cling value was 0 grams per inch, and the re-cling value was 0 grams per inch. Both of the cling values were not acceptable levels of adhesion.

Example 5

The process of Example 4 was followed with the exception that the blend comprised 50% by weight CV27507-F ethylene-hexene interpolymer and 50% by weight SP1330 ethylene-methyl acrylate interpolymer. In this instance, testing for the level of peel force required to separate the multilayer film from the substrate layer revealed an initial cling value of 17 grams per inch, and a reeling value of 13.4 grams per inch. Both of the cling values are acceptable levels of adhesion, and this multilayer film was particularly useful as a masking film.

Example 6

The process of Example 4 was followed with the exception that the blend comprised 25% by weight CV27507-F ethylene-hexene interpolymer and 75% by weight SP1330 ethylene-methyl acrylate interpolymer. Testing for the level of peel force required to separate the multilayer film from the substrate layer revealed an initial cling value of 38.2 grams per inch, and a re-cling value of 20.4 grams per inch. Both of the cling values are acceptable levels of adhesion, and this multilayer film was particularly useful as a masking film.

From the data in Examples 2, 3, 5 and 6, it is observed that the present process results in the preparation of products having an acceptable level of adhesion, such that use as a masking film system is appropriate. The effect is not found in Examples 1 and 4, where the process differs from that described herein.

The invention has been described above in detail with particular reference to preferred embodiments thereof, but it will be understood that variations and modifications other than as specifically described herein can be effected within the spirit and scope of the invention. Moreover, all patents, patent applications, provisional patent applications, and literature references cited above are incorporated herein by reference for any disclosure pertinent to the practice of this invention.

We claim:

1. A process for producing multilayer structures comprising (a) forming by cast process a monolayer film layer from a blend comprising (1) an ethylene-alpha-olefin interpolymer, wherein the alpha-olefin has from 3 to 16 carbon atoms, having a melt index ranging from about 0.3 to about 10 g/10 min., and a density ranging from about 0.88 to less than 0.920 g/cc, present in an amount of from less than 75% to about 10% by weight of the blend, and (2) an ethylene-alkyl acrylate interpolymer, wherein the alkyl group has from 1 to 10 carbon atoms, having a melt index ranging from about 0.3 to about 20 g/10 min., an ethylene content of from about 70% to about 85% by weight of the ethylene-alkyl acrylate interpolymer, and an alkyl acrylate content of from about 15 to about 30% by weight of the ethylene-alkyl acrylate interpolymer, present in an amount of from greater than 25% to about 90% by weight of the blend, and (b) pressing the monolayer film layer onto a substrate layer wherein the substrate layer is selected from the group consisting of a polymeric material or glass, and wherein the substrate layer is maintained at a temperature ranging from about 38° C. to about 80° C. during the pressing of the monolayer film layer onto the substrate layer.

2. The process according to claim 1 wherein the alpha-olefin of the ethylene-alpha-olefin interpolymer is 1-hexene, and the alkyl acrylate of the ethylene-alkyl acrylate interpolymer is methyl acrylate.

3. The process according to claim 1 wherein the ethylene-alpha-olefin interpolymer has a melt index ranging from about 0.5 to about 3 g/10 minutes.

4. The process according to claim 1 wherein the ethylene-alkyl acrylate interpolymer has a melt index ranging from about 0.4 to about 10 g/10 minutes.

5. The process according to claim 1 wherein the substrate layer is a polymeric material.

6. The process according to claim 2 wherein the ethylene-1-hexene interpolymer has a melt index of 0.85 g/10 min. and a density of 0.910 g/cc, the ethylene-methyl acrylate interpolymer has a melt index of 2.1 g/10 min. and a methyl acrylate content of 24% by weight of the ethylene-methyl acrylate interpolymer, and the substrate layer is a copolyester.

7. The process according to claim 2 wherein the ethylene-1-hexene interpolymer has a melt index of 0.85 g/10 min. and a density of 0.910 g/cc, the ethylene-methyl acrylate interpolymer has a melt index of 2.0 g/10 min. and a methyl acrylate content of 22% by weight of the ethylene-methyl acrylate interpolymer, and the substrate layer is a copolyester.

8. A process for producing multilayer structures comprising (a) forming by cast process a multilayer film layer of which at least one of the film layers is formed from a blend comprising (1) an ethylene-alpha-olefin interpolymer, wherein the alpha-olefin has from 3 to 16 carbon atoms, having a melt index ranging from about 0.3 to about 10 g/10 min., and a density ranging from about 0.88 to less than 0.920 g/cc, present in an amount of from less than 75% to about 10% by weight of the blend, and (2) an ethylene-alkyl acrylate interpolymer, wherein the alkyl group has from 1 to 10 carbon atoms, having a melt index ranging from about 0.3 to about 20 g/10 min., an ethylene content of from about 70% to about 85% by weight of the ethylene-alkyl acrylate interpolymer, and an alkyl acrylate content of from about 15 to about 30% by weight of the ethylene-alkyl acrylate interpolymer, present in an amount of from greater than 25% to about 90% by weight of the blend, and (b) pressing the multilayer film layer onto a substrate layer wherein the substrate layer is selected from the group consisting of a polymeric material or glass, and wherein the substrate layer is maintained at a temperature ranging from about 38° C. to about 80° C. during the pressing of the multilayer film layer onto the substrate layer.

9. The process according to claim 8 wherein the alpha-olefin of the ethylene-alpha-olefin interpolymer is 1-hexene, and the alkyl acrylate of the ethylene-alkyl acrylate interpolymer is methyl acrylate.

10. The process according to claim 8 wherein the ethylene-alpha-olefin interpolymer has a melt index ranging from about 0.5 to about 3 g/10 minutes.

11. The process according to claim 8 wherein the ethylene-alkyl acrylate interpolymer has a melt index ranging from about 0.4 to about 10 g/10 minutes.

12. The process according to claim 8 wherein the substrate layer is a polymeric material.

13. The process according to claim 9 wherein the ethylene-1-hexene interpolymer has a melt index of 0.85 g/10 min. and a density of 0.910 g/cc, the ethylene-methyl acrylate interpolymer has a melt index of 2.1 g/10 min. and a methyl acrylate content of 22% by weight of the ethylene-methyl acrylate interpolymer, and the substrate layer is a copolyester.

14. The process according to claim 9 wherein the ethylene-1-hexene interpolymer has a melt index of 0.85 g/10 min. and a density of 0.910 g/cc, the ethylene-methyl acrylate interpolymer has a melt index of 2.0 g/10 min. and a methyl acrylate content of 24% by weight of the ethylene-methyl acrylate interpolymer, and the substrate layer is a copolyester.

15. The process according to claim 8 wherein the multilayer film layer formed by the cast process further comprises a polymeric film layer.

16. The process according to claim 15 wherein the polymeric film layer is a polyethylene film layer.

* * * * *